s010732413B2

United States Patent
Parkinson

(10) Patent No.: US 10,732,413 B2
(45) Date of Patent: **\*Aug. 4, 2020**

(54) MULTI-PROCESS ACCESS TO A SINGLE-PROCESS RESOURCE

(71) Applicant: RealWear, Incorporated, Vancouver, WA (US)

(72) Inventor: Christopher Iain Parkinson, Richland, WA (US)

(73) Assignee: REALWEAR, Incorporated, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,491

(22) Filed: May 9, 2019

(65) Prior Publication Data
US 2019/0265475 A1    Aug. 29, 2019

Related U.S. Application Data

(63) Continuation of application No. 15/650,602, filed on Jul. 14, 2017, now Pat. No. 10,330,932.

(51) Int. Cl.
*G06F 9/54* (2006.01)
*G02B 27/01* (2006.01)
(Continued)

(52) U.S. Cl.
CPC ............ *G02B 27/017* (2013.01); *G06F 3/011* (2013.01); *G06F 3/012* (2013.01); *H04L 29/06* (2013.01);
(Continued)

(58) Field of Classification Search
CPC ............. G06F 9/54; G06F 16/40; G06F 16/00
See application file for complete search history.

(56) References Cited

U.S. PATENT DOCUMENTS 6,747,611 B1 *  6/2004  Budd ................. G02B 27/0172
                                                                 345/7
6,983,370 B2    1/2006  Eaton et al.
(Continued)

FOREIGN PATENT DOCUMENTS

EP        3062260 A1      8/2016

*Primary Examiner* — Ernest Unelus
(74) *Attorney, Agent, or Firm* — Shook, Hardy & Bacon L.L.P.

(57) ABSTRACT

Systems and methods provide concurrent access to a single input resource. An audio stack of a computing device can receive multiple requests from applications to provide concurrent access to audio data received via an input resource, such as audio data received via an audio card coupled to a microphone. A request to access the resource is received from a first application. Based on the request, a cache memory is instantiated to model a memory buffer of the resource. A direct session between a component of the audio stack and the resource is established. As audio data is encoded, the audio stack component can receive the encoded audio data and write the audio data into the cache. A first session between the first application and the cache is generated, such that the first application interprets the cache as the audio input resource buffer memory. The first session can provide the first application with access to audio data in real-time, as if the audio data were being received directly from the audio stack component. A second application requesting access to the resource can be provided with a second session to facilitate concurrent access to the audio input data.

18 Claims, 11 Drawing Sheets

(51) Int. Cl.
*G06F 3/01* (2006.01)
*H04L 29/06* (2006.01)
*H04N 7/18* (2006.01)
*G09G 5/36* (2006.01)
*G02B 27/00* (2006.01)
*H04N 7/14* (2006.01)

(52) U.S. Cl.
CPC .. *G02B 27/0093* (2013.01); *G02B 2027/0138* (2013.01); *G02B 2027/0187* (2013.01); *G09G 5/36* (2013.01); *H04N 7/142* (2013.01); *H04N 7/185* (2013.01)

(56) References Cited

U.S. PATENT DOCUMENTS

| | | | |
|---|---|---|---|
| 7,620,753 | B1 | 11/2009 | Beaman et al. |
| 2010/0083268 | A1 | 4/2010 | Morris |
| 2011/0314185 | A1* | 12/2011 | Conroy ................ G06F 1/3203 710/22 |
| 2017/0084280 | A1* | 3/2017 | Srinivasan ............ G10L 19/005 |

* cited by examiner

MULTI-PROCESS ACCESS TO A SINGLE-PROCESS RESOURCE

CROSS REFERENCE TO RELATED APPLICATIONS

This cross reference to related applications is a Continuation Application of U.S. application Ser. No. 15/650,602, filed Jul. 14, 2017; the entirety of which is incorporated herein by reference.

BACKGROUND

Mobile computing devices, such as mobile phones or head-mounted displays, provide users with robust technologies that are portable and capable of performing a variety of tasks. Such devices, despite their small profile, include hardware components that each perform a specialized function, just like a standard desktop PC. Also like the standard desktop PC, mobile devices rely on a traditional computing infrastructure, that includes at least an application layer, an operating system layer, and a hardware layer. Each of these layers facilitate the translation of operations received by a user into operations performed by one or more hardware components. For instance, a user initiating a phone call by hitting a "dial" button can be submitted via an application running on the operating system. The operating system can then communicate with the hardware layer, which in turn facilitates the translation of the received instruction to initiate the phone call by activating a microphone, a speaker, and a radio, among other things.

The traditional mobile device and its included hardware components can be fairly limited in functionality based on restraints placed by device and component manufacturers. More specifically, mobile devices are typically configured to focus on running one application at a time. While in some aspects, multiple applications can be concurrently executed on a mobile device, and multiple operations can be concurrently executed by these applications, the capability of concurrently communicating or accessing various hardware components is generally limited by the operating system or other drivers for communicating with the components. By way of example, when a user is recording audio on their mobile device, for instance, running a voice recording application, the user will be prohibited from recording at least the audio portion of a video, because the microphone is, in essence, locked by the voice recording application. While some mobile devices may opt for multiple microphones to overcome this limitation, some devices, such as a head-mounted display, may have a microphone placed in an ideal position (e.g., on a boom). When dealing with such a configuration (e.g., utilizing a microphone for audio input), an application could essentially lock access to the audio input component or resource when being utilized by a process of the application, thereby limiting access to other application processes that may require use of the audio input component or resource, such as a voice-control interface.

Embodiments of the present invention relate to, among other things, techniques for facilitating multi-process access to a single-process resource. In particular, embodiments of the present invention are generally directed toward systems, methods, and computer storage media for providing an improved component resource stack, such as an audio stack, to enable multiple applications or processes thereof to access a component that is configured to limit access to a single application or process thereof.

By receiving a request from a first application process to access an input resource (e.g., microphone input), the first application process can employ a resource stack in accordance with the herein described embodiments that can establish a connection between the first application process and the input resource without limiting access to other application processes. The resource stack, upon receiving the request, can establish access to the input resource, and instantiate a cache memory to store one or more portions of the input data received from the input resource. Further, the resource stack can generate a session between the first process and the instantiated cache memory, thereby providing a false indication to the first application process that typical access to the input resource has been established. That is, because the first application process expects exclusive access to the input resource, the resource stack generates a session that establishes the expected connection to the input resource, while enabling other application processes to also request and establish connections thereto. When a second request to access the input resource is received from a second application process, the resource stack can generate another session between the second application process and the instantiated cache memory, again providing a false indication to the second application process that typical access to the input resource has been established. As each application process is, in essence, connected to the instantiated cache memory of the input resource, each application process can receive, via their respective generated sessions, input data written into the instantiated cache memory of the input resource.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1A:
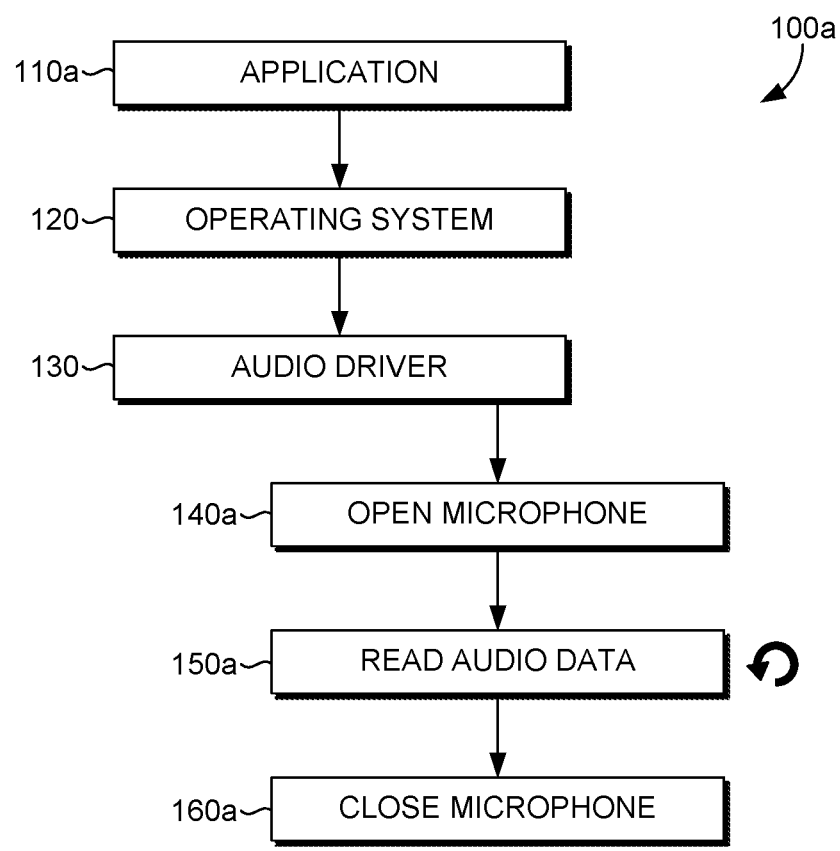
FIGS. 1A-1B are operational flow diagrams illustrating input resource allocation in accordance with the prior art.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various mobile devices or wearable computing devices have limitations with respect to the usability of their available resources. More specifically, certain hardware components of such devices, such as audio input (e.g., microphone input) resources, are designed to provide limited access to one application process at a time. While reasons for limiting such access could be justified (e.g., to prevent process conflicts or as a quality assurance measure), these limitations can be prohibitive in circumstances where concurrently running processes may require access to these resources. For instance, as digital assistants (e.g., voice-controlled interfaces) become increasingly ubiquitous, the ability to control one's device by voice-command must be available at all times. Thus, in order for a voice-controlled operating system or input controller to receive and interpret voice commands while an application process is accessing the audio input resource, it must be able to concurrently access and receive audio data from the input resource.

The conventional operating system of mobile computing devices employs an audio driver that facilitates instructions to be received from an active application process and by the hardware layer. In such devices, when an audio-receiving application (e.g., a telephony application) is executing, and a process of the application requests use of the microphone, the application process will request the operating system to provide access to the audio resource. As such, the operating system will employ an audio driver to facilitate a session between the application process and the hardware component (e.g., the audio resource). In some instances, the application process will require exclusive access to the audio resource to prevent conflicts or confusion. However, in certain circumstances, the very nature of excluding other processes from accessing the audio resource can interfere with the desired operation of the device.

As described, voice-activated operating systems and/or voice-operated input controllers rely on the constant availability of audio inputs to facilitate voice-controlled navigation and general operation of a voice-controlled device. As such, when an application process on a voice-controlled device locks a hardware resource, in particular an audio input resource employed to detect and receive voice commands from a user, the ability to maintain voice-controlled operability of the device is constrained. By way of example, when a user of a voice-operated mobile device (e.g., a head-mounted display) instantiates an Internet telephony call on their device, the telephony application will expect and establish exclusive access to the audio input resource (e.g., microphone) so that the Internet telephony application can freely receive audio input data via the microphone, and transmit the received audio input data to the call recipient. If, however, the user wishes to terminate the call, or otherwise conduct an operation that is not associated with the telephony application, the very fact that the Internet telephony application is utilizing the audio input resource will exclude the voice-activated operating system or voice-operated input controller from detecting the spoken command.

Due to the fact that developers are limited by the restrictions of manufacturer-developed drivers, resource stacks provided by the operating system, or by applications that request and acquire exclusive access to hardware resources, like audio input resources, it would be desirable to provide systems and techniques for providing new techniques that would not require operating system or application developers to alter their already-developed code, or require component manufacturers to modify their implementations, so that regardless of any restrictions set in place by the app developers or hardware manufacturers, multiple application processes may access and receive input data from an audio input resource without conflict.

By generating sessions (e.g., inter-process communications or IPCs) to facilitate connections to multiple application processes, and instantiating a cache memory to so that each application process can read audio data written into the cache by the audio stack, multiple application process can connect to an audio input resource without restriction. In some aspects, when any one or more applications expect exclusive access to the audio input resource, the audio stack can provide the applications with a false indication that exclusive access to the audio input has been established. Each application process can continue to operate as expected, and the audio stack in accordance with some of the described embodiments can facilitate an expected operation or response to the applications to avoid any errors or failures, as would typically occur without the described solutions.

Moreover, in some aspects, the audio stack can further include a resampling operation to provide any of the application processes with a bitrate required or requested thereby. By employing any of the described embodiments, the described techniques facilitate an expansion of any existing framework to facilitate voice-operated control with any application or operation without restriction. The described techniques also employ a single cache memory that is distributed to any requesting application process, to maintain a low memory profile and provide efficient utilization of the existing application framework. In accordance with some embodiments described herein, an "audio stack" includes a collection of components and/or code that can be spread across a one or more layers of a computing framework. For instance, an audio stack can include components and/or code included in any combination of computing layers, including but not limited to a low-level hardware (e.g., physical) access layer, a hardware abstraction layer, a data link layer, a network layer, a transport layer, a session layer, an operating system layer, a presentation layer, and an application layer.

Figure 1B:
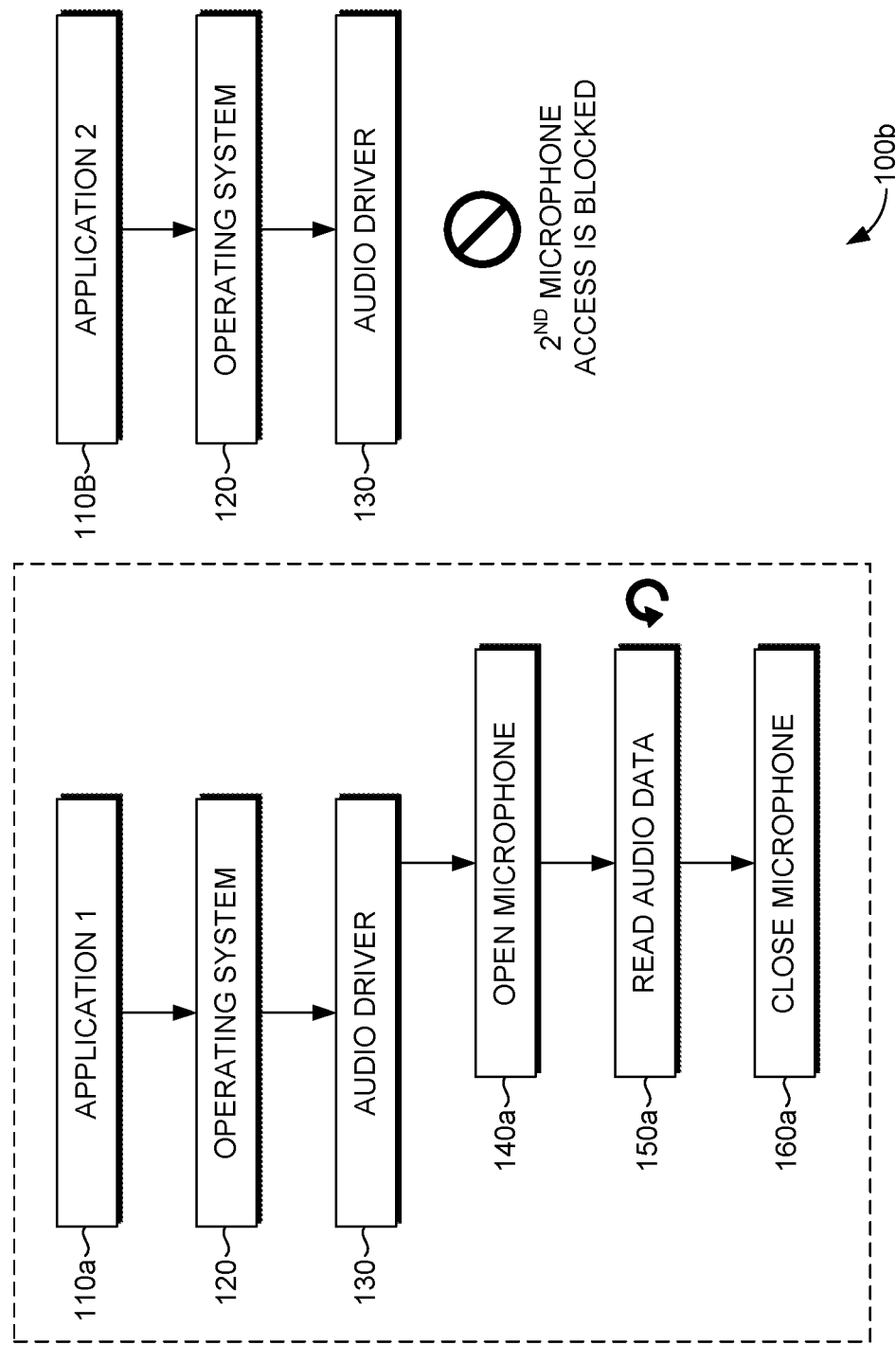

With brief reference to FIGS. 1A-1B, the illustrated operational flow diagrams and corresponding description provide a summary of the restrictions imposed by the prior art. That is, conventional techniques for providing access to an audio input resource are restrictive to the extent that only a single application process can exclusively access an audio input resource at a time. As described, the conventional computing framework for facilitating audio input resource access to an application process is implemented such that only one application process can exclusively access the audio input resource at a given time. Looking now at FIG. 1A, the illustrated operational flow diagram depicts a conventional operational flow 100a of an application process 110a requesting access to a microphone. In conventional systems, an application process 110a can generate a request, to the operating system 120 on which the associated application is running, to access the microphone. Upon receiving the request, the operating system 120a initializes and employs an audio stack 130 associated with the hardware component with which the microphone is associated (e.g., an auxiliary input port or a built-in microphone module) to open a session 140a between the application process and the associated hardware component, via the audio stack. Upon opening the session, the audio stack reads audio data 150a from the associated hardware component, and communicates the audio data back up to the application 110a via the open session 140a. When the application process 110a has completed its task, a close signal is generated by the application process 110a to close the session 160a. In conventional systems, applications and hardware components have been implemented to comply with standardized APIs and operations provided by the operating system on which they run. In this regard, application developers and hardware component manufacturers have strictly abided by these protocols to offer their products for inclusion in such systems.

Looking now at FIG. 1B, the illustrated operational flow diagram depicts a conventional operational flow 100b of a second application process 110b requesting access to the same microphone of FIG. 1A, while a first application process 110a already has access to the microphone. In other words, the operational flow 100b illustrates how requests to access an input resource are handled when already being utilized by an application process, as implemented by the prior art. In these conventional systems, a second application process 110b can generate a request to the operating system 120 to access the microphone, just like the first application process 110a did as described in FIG. 1A. Also similar to the described operational flow 100a of the first application process 110a, the operating system 120 communicates the request to the audio stack 130 associated with the hardware component with which the microphone is associated. However, because the first application process 110a has already been given exclusive access to the microphone, the audio stack 130 determines that the associated hardware resource is busy or unavailable, and the second application process 110b is blocked from accessing the microphone.

Briefly, as one may appreciate, in various situations where multiple applications or processes thereof could benefit from accessing the audio data being read from the audio input resource (e.g., via a microphone), the limitations of the prior art are severely restrictive from implementing a number of forthcoming advancements to mobile technology. Voice-controlled operations, for instance, require always-on speech-detection capability to navigate and/or control operations of a voice-controlled device. In some circumstances, such devices can be restricted from executing applications that may interfere with an audio input resource. In other circumstances, some devices may employ a hardware button that could manually terminate or temporarily disable an existing audio session, so that a voice-detecting process can be executed and a speech command heard to perform a user's desired operation. Other implementations, such as incorporating multiple microphones may also be utilized. However, these solutions are either overly restrictive, or may entail costly modifications and/or additional hardware components to provide a solution that embodiments described herein set out to achieve.

Figure 2:
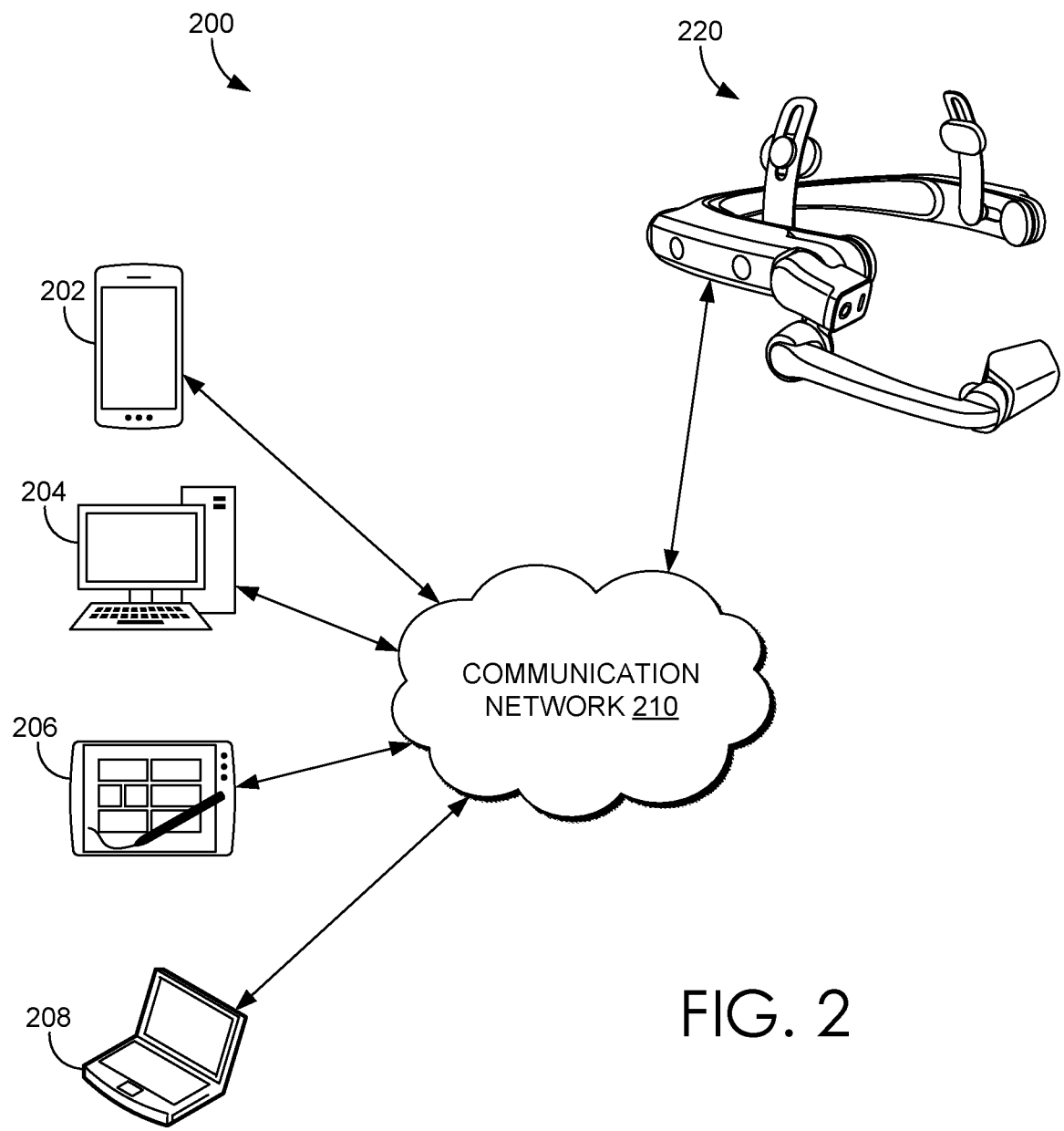
FIG. 2 is a block diagram illustrating an exemplary computing environment, in accordance with some implementations of the present disclosure.

Looking now to FIG. 2, FIG. 2 provides a block diagram showing an exemplary operating environment 200 for operating a computing device (e.g., a wearable device) in accordance with some implementations of the present disclosure. Environment 200 includes one or more wearable devices, such as but not limited to head-mounted display (HMD) device 220 and one or more user computing devices. Such user computing devices include, but are not otherwise limited to smartphone 202, desktop 204, tablet 206, and laptop 208. Various embodiments of HMD device 220 are discussed in conjunction with at least FIGS. 3, 4A, and 4B. However, briefly here, HMD device 220 is a wearable computing device that provides computing and communication capabilities to the wearer. In the non-limiting body shown in FIG. 2, a wearable device (e.g. HMD device 220) may be worn about the head of the user. Other embodiments are not so limited. Various embodiments of user computing devices, such as computing devices 202-208 are discussed in conjunction with FIG. 9. The HMD device 220 can include but is not limited to, like any mobile computing device, wearable computing device, or computing device, a conventional or modified computing framework including, but not limited to, an operating system, hardware components, resource stacks and/or drivers associated with the hardware components, applications for execution on the operating system, and the like.

Environment 200 additionally includes a communication network, such as but not limited to communication network 210, which can communicatively couple each of user computing devices 202-208 and HMD device 220. Communication network 210 may be any communication network, including virtually any wired and/or wireless communication technologies, wired and/or wireless communication protocols, and the like. It should be understood that communication network 210 may be virtually any network that communicatively couples at least one of user computing devices 202-208 with a wearable device, such as but not limited to HMD device 220.

Figure 3:
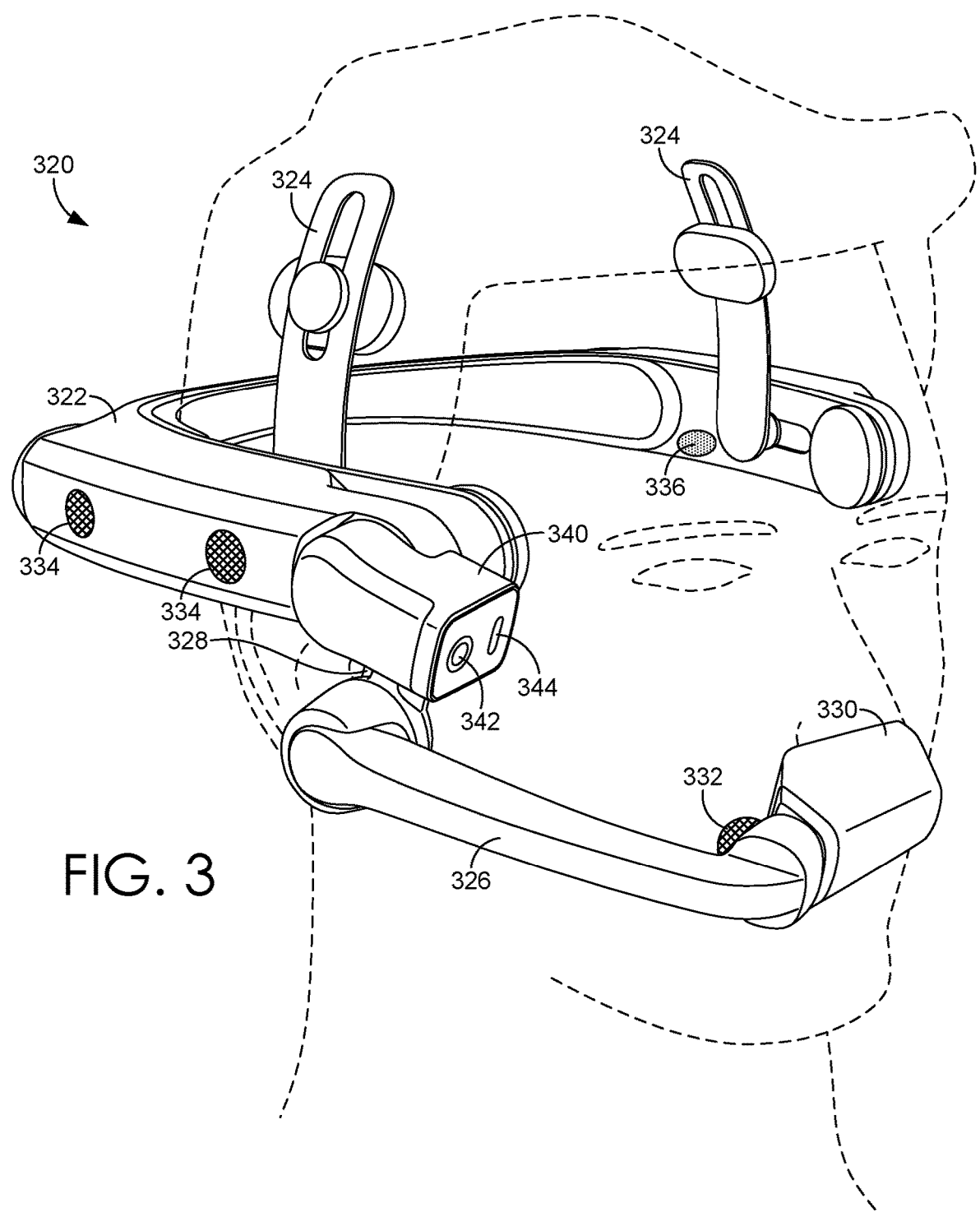
FIG. 3 is an illustration of an exemplary head-mounted display device, in accordance with some implementations of the present disclosure.

FIG. 3 shows an exemplary embodiment of a HMD device 320, in accordance with some implementations of the present disclosure. HMD device 320 is a wearable device and may include similar features to that of computing device 900 of FIG. 9. HMD device 320 may be similar to HMD device 220 of FIG. 2. HMD device 320 includes a frame member 322. Frame member 322 may be a frame structure. As shown in FIG. 3, frame member 322 is configured and arranged for wearing by a user. For instance, frame member 322 may be worn about the user's head. HMD device 320 may additionally include one or more stabilizing members 324 (or stabilizing structures) that stabilize the frame member 322 about the user's head.

HMD device 320 may include one or more rotating members, such as but not limited to first rotating member 326 and second rotating member 328. As discussed in conjunction with FIGS. 4A-4B, at least one rotating members 326 or 328 is rotatably coupled to frame member 322, i.e. at least one of rotating members 326 or 328 is coupled to frame member and configured and arranged for rotating relative to frame member 322. In at least one embodiment, first rotating member 326 may be a boom arm that is coupled to a display module 330. Display module 330 houses a display device (not shown in FIG. 3) that is directed towards the eyes of the users. As shown in FIG. 3, the display device is within the user's line-of-sight (LOS). As discussed in conjunction with FIGS. 4A-4B, the user may re-position the display device, via a rotation of one or more of rotating members 326/328, such the display device is excluded from the user's LOS. Note that in the view of HMD device 320 shown in FIG. 3, the display device is occluded by external surfaces display module 330.

HMD device 320 includes various electroacoustic transducers (e.g. microphones and audio speakers). One such electro acoustic transducer 332 is located near a distal end of rotating member 326. Electroacoustic transducer 332 may be a primary microphone. In various embodiments, HMD device 320 includes one or other electroacoustic transducers, including but not limited to one or more auxiliary microphones 334 and one or more audio speakers, such as but not limited to audio speaker 336.

HMD device 320 may include an optical module 340 that houses one or more photon-detectors (e.g. camera devices), such as photon-detector 342 and a projection system 344. Projection system 344 may include one or more photon-emitters (e.g. scanning lasers, scanning light emitting diodes (LED), and the like). Optical module 340 may be configured and arranged to rotate relative to frame member 322, such that the field-of-view (FOV) of the photon-detector 342 may be rotationally varied. In at least some rotational orientations of optical module 340, the FOV of photon-detector 342 is at least similar to the FOV of the user.

Figure 4A:
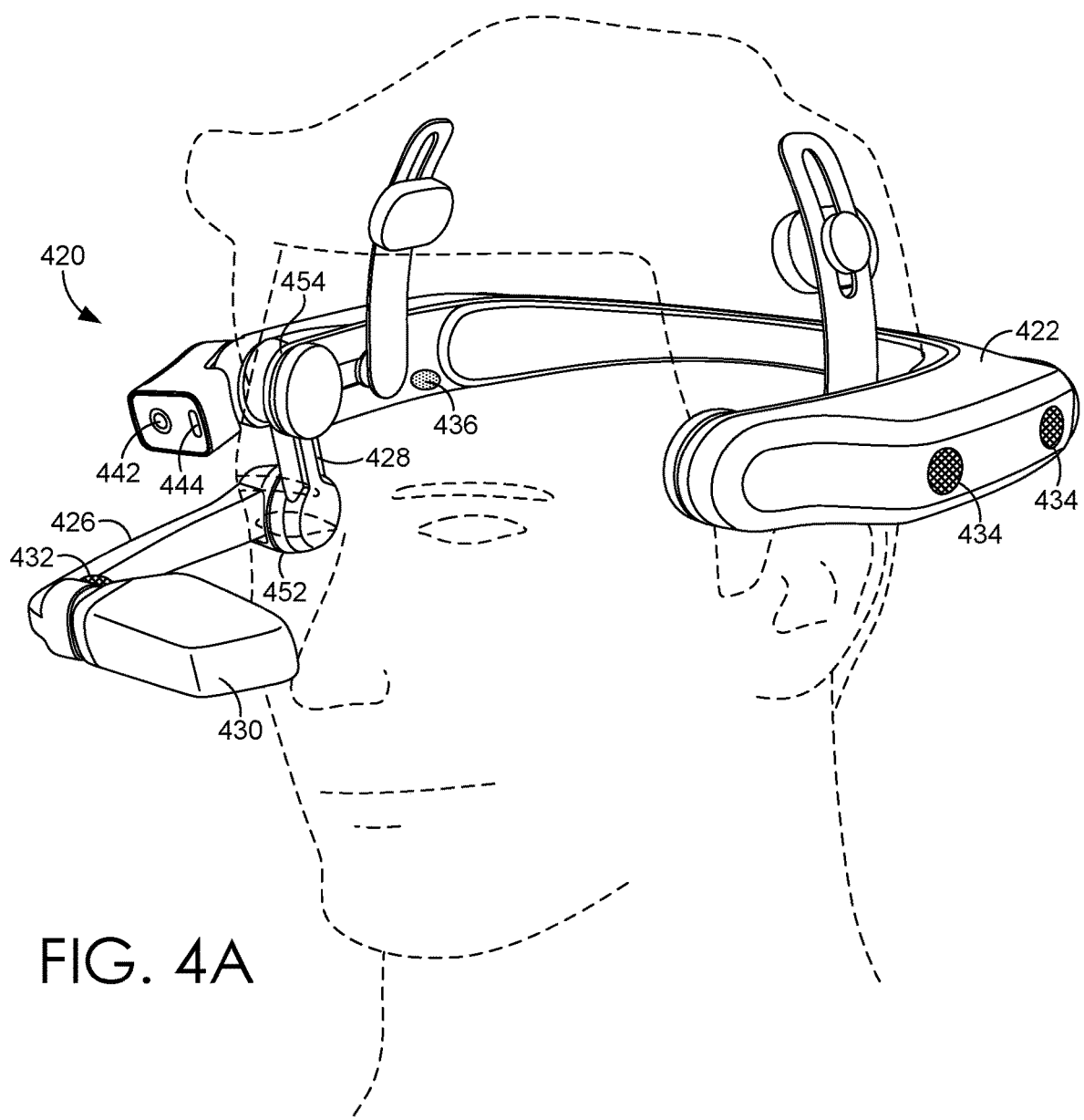
FIG. 4A is an illustration of an exemplary head-mounted display device, in accordance with some implementations of the present disclosure.
Figure 4B:
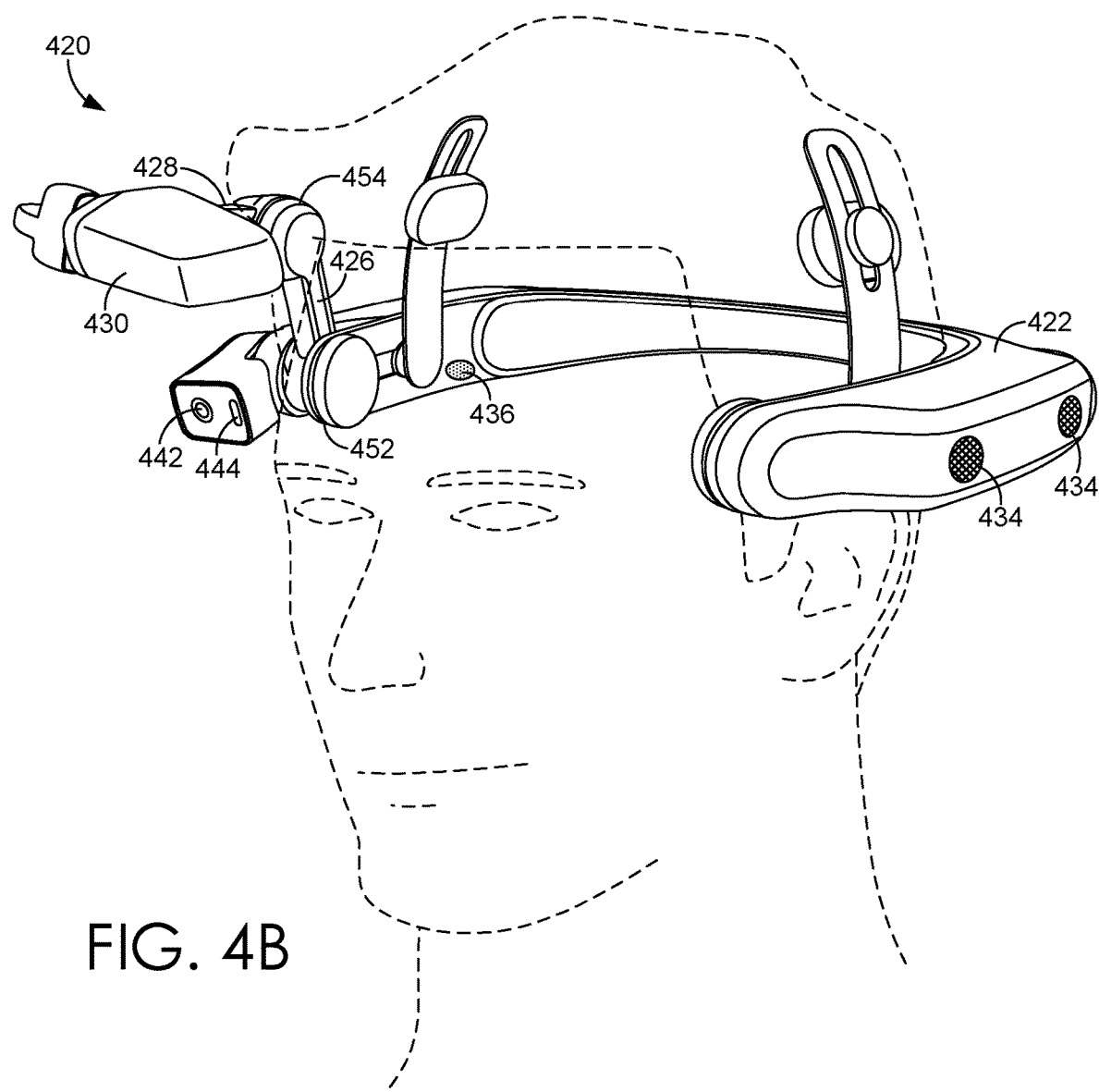
FIG. 4B is an illustration of an exemplary head-mounted display device, in accordance with some implementations of the present disclosure.

FIG. 4A shows an exemplary embodiment of HMD device 420, where the position of the display device is within the LOS of the user. FIG. 4B shows the HMD device 420 of FIG. 4A, where the position of the display device is outside the LOS of the user. In the various embodiments, when the display device is positioned such as that shown in FIG. 4A, HMD device 420 may be operated in a first operational mode (e.g. a display mode). When the display device is positioned outside of the user's line-of-sight (LOS) (such as that shown in FIG. 4B), HMD device 420 is operated in a second operational mode (e.g. a projection mode).

HMD device 420 includes frame member 422, first rotating member 226, and second rotating member 428. HMD device 420 includes primary microphone 432 and multiple auxiliary microphones 434, as well as one or more audio speakers 436. Furthermore, HMD device 420 includes one or more cameras 442 and projection system 444. Projection system 444 may include one or more photon-emitters, such as but not limited to scanning laser sources and/or scanning LEDs. Camera 442 may be a photon-detector. Display module 440 houses the display device that is directed towards the eyes of the user. Note that in the view of HMD device 420 shown in FIGS. 4A-4B, the display device is occluded by external surfaces display module 440.

As noted above, FIG. 4A shows that display module 440 may be positioned such that the display device is within the line-of-sight (LOS) of the user. A comparison of FIG. 4B with FIG. 4A shows that at least one of first rotating member 426 and/or second rotating member 428 can be rotated, relative to frame member 422, such that the display device is outside of (or excluded from) the LOS of the user. More particularly, second rotating member 428 is rotatably coupled to frame member 422 via a first rotational joint 454 and first rotating member 426 is rotatably coupled to second rotating member 428 via a second rotational joint 452.

Thus, by varying at least one or a first rotational orientation between the frame member 422 and the second rotating member 428 and/or a second rotational orientation between the second rotating member 428 and the first rotating member 426, a user may rotate the position of the display axis about an axis relative to their head.

More particularly, by rotating the position of the display (about the axis relative to their head), the user may selectively position the display module 440 such that the display device is within their LOS. Similarly, the user may selectively position the display module 440 such that the display device is outside of (or excluded from) from their LOS by varying the first rotational orientation between the frame member 422 and the second rotating member 428 and/or the second rotational orientation between the second rotating member 428 and the first rotating member 426. Note that by varying the first rotational orientation, a first angle between the frame member 422 and the second rotating member 428 is varied. Similarly, varying the second rotational orientation generates a variance in a second angle between the second rotating member 428 and the first rotating member 426. Further note that by varying at least one of the first or the second angle generates a variance in an angle between the display device and the frame member 422.

Whether the display device is within or outside the LOS of the user may be determined based on at least one of a first angle (i.e. the angle between frame member 422 and second rotating member 428), the second angle (i.e. the angle between second rotating member 428 and first rotating member 426), and/or the lengths of first/second rotating members 426/428. In various embodiments, one or more sensors are included in first rotational joint 454 to automatically detect and/or determine the first angle. Similarly, one or more sensors may be included in second rotational joint to automatically determine the second angle. Such sensors may include, but are not otherwise limited to Hall Effect sensors and/or Hall Effect switches. According whether the display device is within or excluded from the user's LOS may be automatically determined based on one or more signals generated by sensors that are employed to detect a relative rotation and/or an angle between multiple members of a wearable device, such as but not limited to HMD device 420.

HMD device 420, as shown in FIGS. 4A-4B, is a non-limiting embodiment, and transitioning and/or repositioning a display device within and out of the user's LOS may be accomplished via configurations other than relative rotations and/or rotational orientations of frame member 422, first rotating member 426, and second rotating member 428. Note that first and second rotating members 426/428 may comprise a rotatable boom arm for supporting the display module 440. Thus, the boom arm may be articulated within and out of the user's LOS. Furthermore, other methods for determining when the display device is within or outside of the user's LOS may be employed for other configurations other than relative rotations between members of HMD device 420. For instance, relative translations between members supporting the display device may be sensed and/or detected.

In accordance with the some of the described embodiments, with brief reference back to FIG. 3, the HMD 320 includes a primary microphone 332 that can be employed to receive audio data from the user, among other things. While it is contemplated that any one or more microphones, disclosed or not described, can be employed to receive audio data from the user, by the computing device in accordance with the described embodiments, the primary microphone 332 is utilized herein for descriptive purposes, and as an exemplary input device (e.g., microphone) for the reception of audio signals from the user, and to the audio input resource (e.g., audio input component). Also, while not depicted by the illustrated embodiments, the audio input component can include any hardware component that receives audio input signals from a coupled audio input device (e.g., a microphone or audio source). For instance, an audio input component can include any audio input interface, such as an audio card having any number of audio inputs (e.g., auxiliary jacks, USB jacks, optical inputs, wireless inputs), a wireless audio card (e.g., Bluetooth, Wi-Fi), or an integrated audio controller (e.g., integrated into a CPU or motherboard). Also in accordance with the described embodiments, the microphone is coupled (e.g., directly or wirelessly) to the audio input component, such that the microphone can receive raw audio signals, which are communicated to the audio input component, where they are processed and encoded into audio data.

Figure 5:
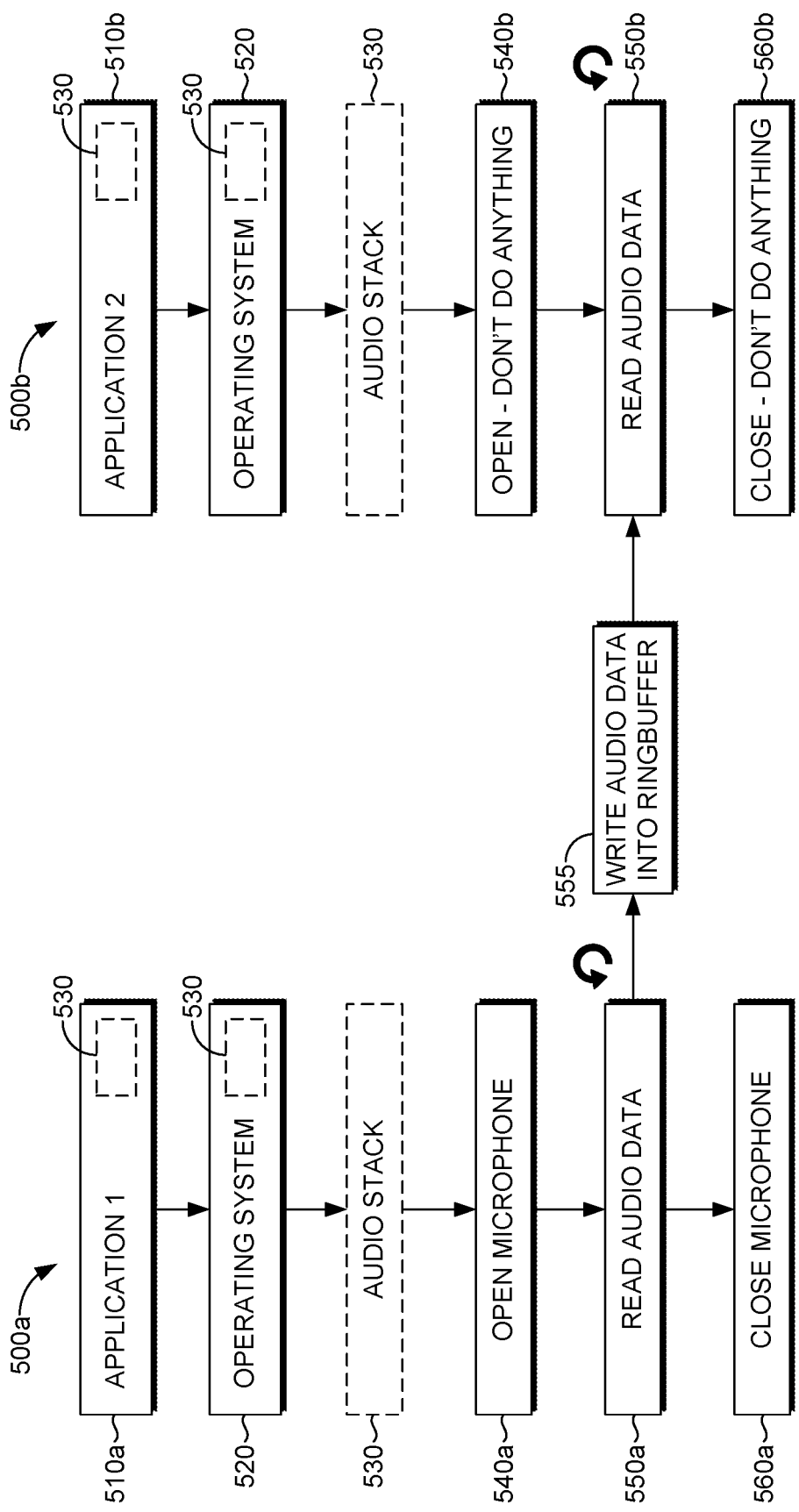
FIG. 5 is an operational flow diagram illustrating input resource allocation, in accordance with some implementations of the present disclosure.

With reference now to FIG. 5, an operational flow diagram 500 depicting two separate operational flows 500a, 500b relating to an improved system for facilitating the concurrent connection of at least two application processes 510a, 510b to a single audio input resource, is provided in accordance with some implementations of the present disclosure. The applications and associated processes 510a, 510b and operating system 520 remain unchanged and unmodified from their conventional implementations, as described with respect to FIGS. 1A-1B. However, audio stack 520 includes improved components that enable features of the disclosed embodiments, as will be described.

Like conventional systems, the application processes 510a, 510b and operating system 520 operate as they were implemented and intended. In other words, no changes or modifications are necessitated to existing applications to facilitate the features of the improved system described herein. Each of the separate operational flows 500a, 500b, while functionally equivalent to the conventional system, on an independent basis, are only facilitated for concurrent operation by the improved audio stack components described in accordance with the present disclosure. Very much like the operational flow diagram depicted in FIG. 1A, a first operational flow diagram 500a associated with a first application process 510a is provided. For purposes of the following description, it is assumed that the audio input resource is available and not in use by any executing application process. Here, a first application process 510a generates and communicates a first request to operating system 520 to access an audio input resource, such as a microphone. The operating system 520, in turn, initializes an audio stack 530 to communicate with the audio input resource.

Unlike the conventional audio stack, audio stack 530 does not attempt to facilitate a direct connection between the application process and the audio input resource. Instead, by virtue of the first application process 510a being the first process to request access to the audio input resource, the audio stack 530 first determines that the audio input resource is available, and upon doing so, instantiates a cache memory such as a ring buffer, in response to receiving the request to establish the session with the audio input component. The audio stack 530 then establishes a direct connection to the audio input resource, such that the audio input data is read 550a by the audio stack from the audio input resource. Further, the audio stack 530 generates a first session between the requesting first application process 510a and the instantiated cache memory. Instead of providing a session between the audio input component memory and the first application process 510a, the audio stack 530 reads the audio input data, via its direct connection to the audio input component, and writes the audio input data to the instantiated cache. The generated first session can provide the first application process 510a with an indication that it has obtained the expected exclusive access to the audio input resource, although the indication is false, as will be described.

When the audio stack begins to read the audio data 550a from a cache memory or buffer of the audio input component (e.g., by way of audio signals received via a microphone), the audio stack 530 can write 555 the read audio data to the instantiated cache memory. By virtue of the generated and established first session between the first application process and the instantiated cache memory, the first application process employs the first audio-stack generated session, just like the conventional session, to read audio data for communication to the associated application. Unlike the conventional system, however, the audio data is read 550a by the first application process 510a directly from the instantiated cache memory of the audio stack 530 at a bitrate requested by the first application process, as will be described with reference to FIG. 6.

In some aspects, when the audio stack 530 makes the determination that the first application process 510a is a first requesting application, the audio stack 530 can flag the first application process 510a as the master process, because it is the first application process to request usage of the audio resource. Moreover, the audio stack 530 can provide the first application process 510 with certain "master process" rights for controlling the audio input resource. For instance, the audio stack 530 can provide the master process with actual rights to set a bitrate configuration for audio signals processed by the audio input resource, or to shut off (e.g. "close" 560a) the audio input resource, among other things. By way of receiving a request by a first application process and determining that a concurrent session is not operational between the audio stack and the audio input resource, the audio stack can employ included parameters of the first application process request to establish its own direct connection to the audio input resource with the included configuration parameters (e.g., requested bitrate).

While the audio stack 530 and audio input component have established a direct session, and the first application process 510a is reading 550a audio data from the instantiated cache memory via the first generated session, a second application process 510b can request access to the audio input resource by way of the audio stack 530. In conventional systems, an audio stack would determine that the audio input resource is busy or unavailable, and reject the second application process's access thereto. However, by way of the improved embodiments described herein, the audio stack 530 can determine whether a master process is concurrently utilizing the audio input resource. Based on determining that a master process exists, the audio stack 530 does not reject the second application process 510b nor does it establish a new connection to the audio input resource. Instead, the audio stack 530 simply generates a new second session between the requesting second application process 510b and the instantiated cache memory Like the generated first session, the audio stack 530 provides the second application process 510b with an indication that it has also obtained the expected exclusive access to the audio input resource, although the indication is false by virtue of both the first application process 510a and the second application process 510b having access to the audio input resource.

Further, any application process that is not flagged as the master process by the audio stack is not provided with the "master process" rights provided to the first application process, which requested first in time access to the audio input component. However, to facilitate expected operation of conventional applications and operating systems, the audio stack 530 can employ one or more components to receive instructions to shut off (e.g. "close" 560b) the audio input resource and in turn, simply terminate the corresponding session.

By way of example, if the second application process 510b generates a request to close its assumed exclusive access to the audio input resource, the request can be received by the audio stack 530 and employed to trigger a command to terminate the second generated session between the instantiated cache memory and the second application process 510b. In this regard, the second application process 510b assumes that the session to the audio input resource is closed, and the second application process 510b can carry on as intended. However, as the first application process 510a has not yet requested to close its assumed exclusive access to the audio input resource, the direct session between the audio stack and the audio input resource remains established, and the first generated session between the first application process 510a and the instantiated cache memory also stays intact. Upon receiving the request to terminate or close access to the audio input resource, by the first application process 510a, the audio stack can terminate its direct session to the audio input resource, terminate the first generated session to the first application process 510a, and/or initialize a garbage collector or a delete operation to clear the instantiated cache memory.

Figure 6:
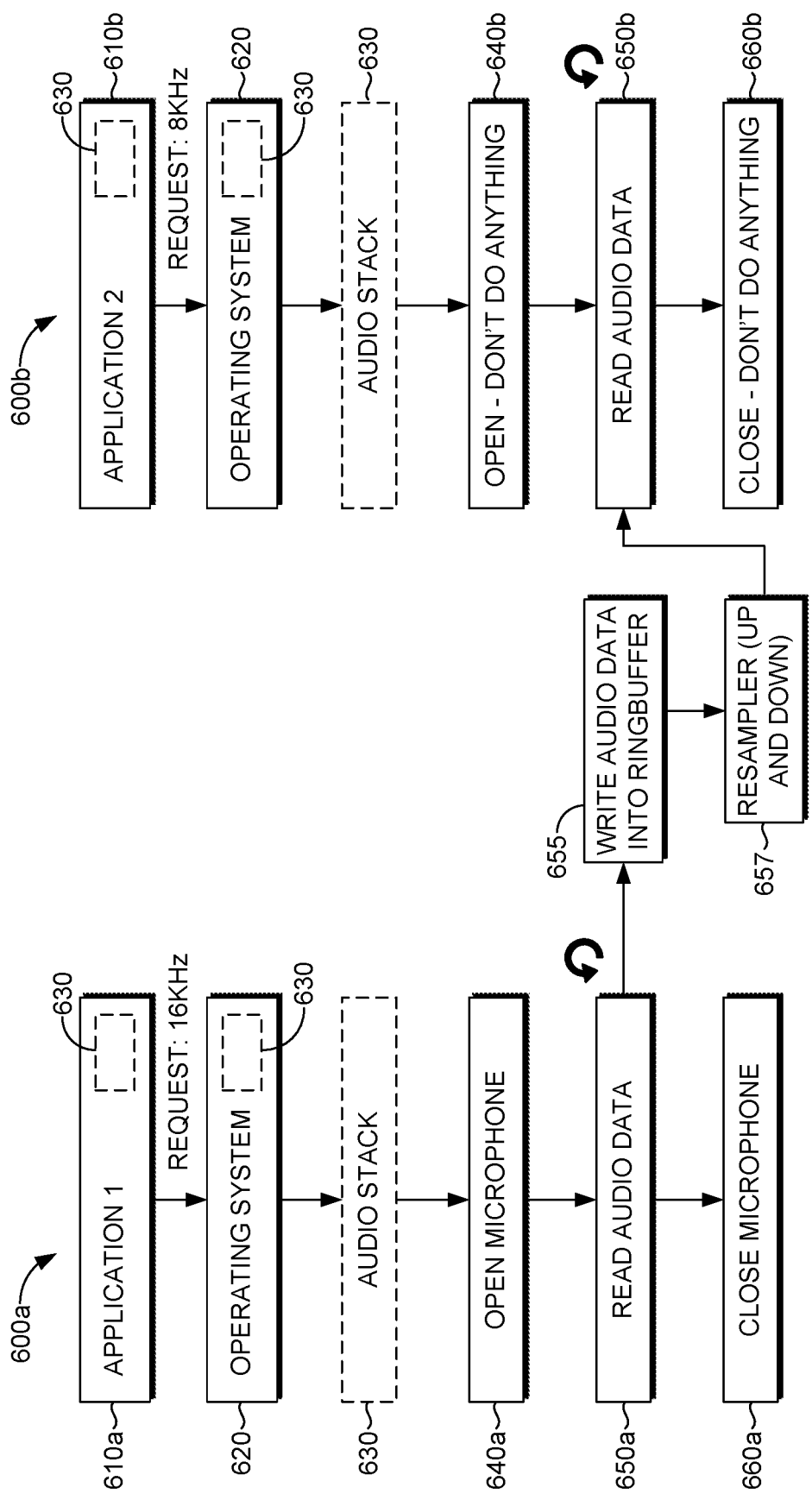
FIG. 6 is an operational flow diagram illustrating input resource allocation, in accordance with some implementations of the present disclosure.

In some further embodiments, various application processes may include different parameters in their requests to access the audio input resource. For instance, a first application process may include in its request to access the audio input component a bitrate parameter of 16 KHz. That is, the first application is requesting that the audio input component encode audio data at a 16 KHz bitrate. At the same time or sometime thereafter, as the first application process is accessing the audio input resource at the requested bitrate, a second application process may include in its request to access the audio input component a bitrate parameter of 8 KHz. Looking now to FIG. 6, an operational flow diagram 600 depicting two separate operational flows 600a, 600b relating to an improved system for facilitating the concurrent connection of at least two application processes 610a, 610b to a single audio input resource, is provided in accordance with some implementations of the present disclosure. FIG. 6 illustrates nearly identical operational flows 600a, 600b as described with relation to FIG. 5. However, FIG. 6 describes an embodiment where two different application processes 610a, 610b include differing bitrate parameters in their requests to access the audio input component.

The first application process 610a can send a request, to the audio stack, that includes a first bitrate parameter (e.g., 16 KHz) that the audio stack 630, upon receipt thereof, causes the audio stack 630 to establish a direct connection to the audio input component with the included bitrate parameter. As noted, the first application process 610a is given priority in this request due to its first in time received request by the audio stack 630. As the audio stack 630 has already established a direct session to the audio input component and a master process has been flagged, any parameters included in a second application process 610b request do not affect the established direct session or characteristics of the instantiated cache memory.

In some embodiments, however, the audio stack 530 can employ a resampling component to directly resample audio data read from the instantiated cache memory, for communication via the second generated session to the requesting second application process 510b, based on a requested bitrate or other parameters included in the second request. In some aspects, the audio stack 630 can also instantiate the cache memory with a particular configuration (e.g., size) to compensate for the requested bitrate. By way of example, a larger bitrate may facilitate the need for a larger cache memory for writing audio data read by the audio stack 630 from the audio input component.

At a later time, after the audio stack 630 and first application process 610a have established the first session there between, the second application process 610b can send a second request, to the audio stack, that includes a second bitrate parameter (e.g., 8 KHz) that is different than the first bitrate parameter. The audio stack 630, having already established a direct connection to the audio input component with the first bitrate parameter, can determine that the second requested bitrate is different than the first requested bitrate. In this regard, in some aspects, the audio stack 630 can instantiate a secondary cache memory to store audio data at the second bitrate. The audio stack 630, in some embodiments, can employ a resampling component 657 that reads audio data written into the instantiated cache memory 655, resamples the audio data from the first bitrate to the second bitrate, and writes the second bitrate audio data into the secondary cache memory. Moreover, based on the audio stack 630 determining that the second request includes the second bitrate parameter that is different than the first bitrate parameter (i.e., the bitrate at which the instantiated cache memory is set), the audio stack 630 can generate the second session between the second application process 610b and the secondary instantiated cache memory.

In some other aspects, the audio stack 630 can simply employ the resampling component 657 to read the audio data from the instantiated cache memory at the first bitrate, resample the audio data from the first bitrate to the second bitrate, and then provide the converted audio data at the second bitrate to the second application process 610b via the second generated session.

Figure 7:
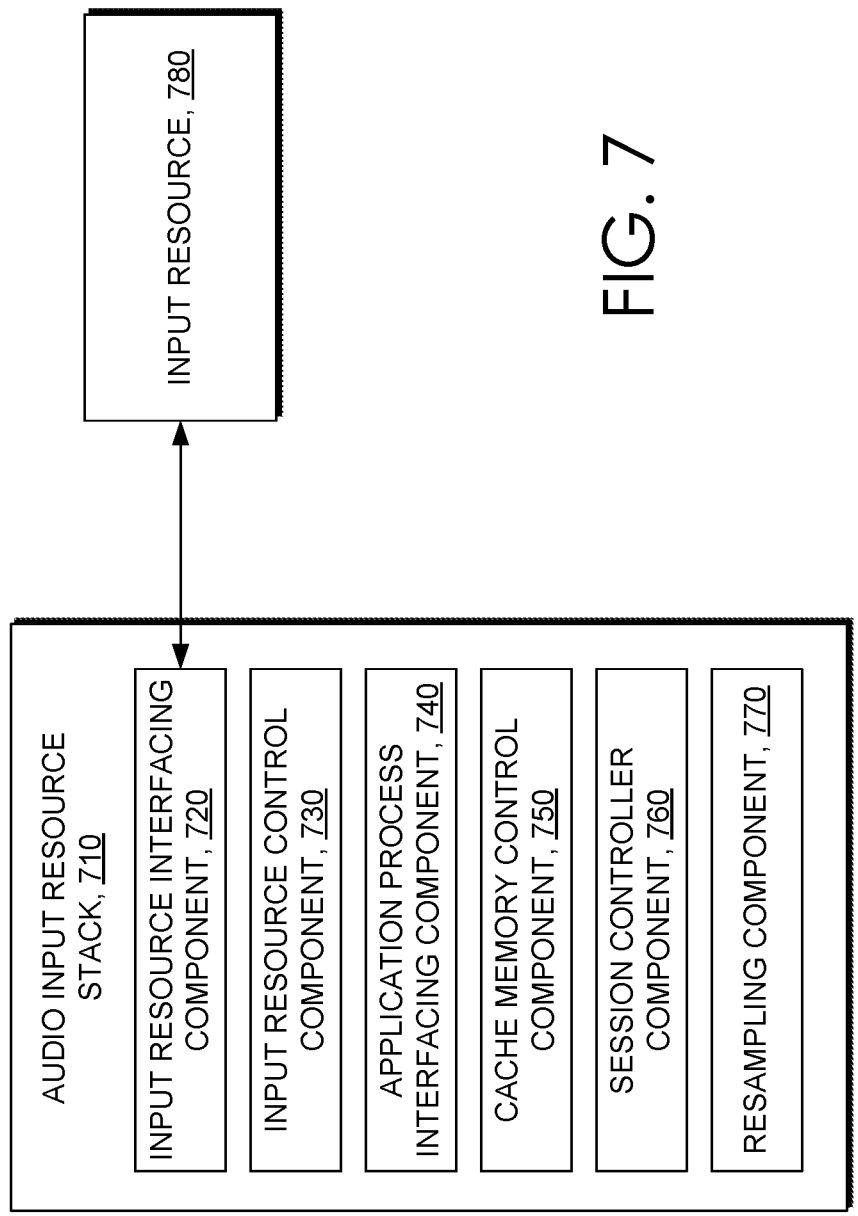
FIG. 7 is a block diagram showing components of an example computing architecture, in accordance with some implementations of the present disclosure.

Looking now to FIG. 7, a block diagram illustrating an audio input resource stack 710 for facilitating multi-process access to a single-process audio input resource 780 is provided in accordance with some implementations of the present disclosure. The audio input resource stack 710 can be implemented in a computing device, such as a head-mounted display of FIG. 3, or any other user device, such as user device 900 of FIG. 9.

The audio input resource stack 710 can be employed by an operating system to facilitate the access and/or control of an associated hardware component by an application executing on the operating system. As described, the operating system can be installed on and employed by any computing device described herein. The audio input resource stack 710 can include an input resource interfacing component 720, an input resource control component 730, an application process interfacing component 740, a cache memory control component 750, a session controller component 760, and a resampling component 770. As described, the audio input resource stack 710 can enable an operating system to communicate various function calls that the stacks can receive to carry out actions on an associated hardware device for which the audio input resource stack 710 is designed.

The input resource interfacing component 720 can include, among other things, hardware-specific code and operations that are customized to carry out actions on an input resource, such as input resource 780. As described, the input resource 780 can include an audio input resource, such as an audio card or wireless Bluetooth receiver, among other things. The audio input resource stack 710 can further include input resource control component 730, that the operating system can employ to communicate function calls, from application processes, to carry out functions indirectly on a device, like the input resource 780. In addition to receiving function calls from the operating system or application processes, the input resource control component 730 can also include logical operations, such as those described in FIGS. 5-6, to negotiate with application processes, instantiate one or more cache memories, facilitate the generation of sessions, and/or resample audio data, in accordance with embodiments described herein.

The application process interfacing component 740 can receive requests, via the operating system, from one or more application processes (e.g., first and second application processes of FIGS. 5-6) concurrently, such that more than one application or processes thereof can access the input resource 780. As described, the application process interfacing component 740 can receive a first in time request from a first application process to access the input resource 780. Based on receiving the first in time request, the audio input resource stack 710 can employ the session controller component 760, the input resource control component 730, and input resource interfacing component 720 to establish a direct session to the input resource 780. That is, the session controller component 760 can establish a direct session between the audio input resource stack 710 and the input resource 780 based on the application process interfacing component's 740 determination that the first application process request is a first in time request, and that no other application process is concurrently in communication with the audio input resource stack 710.

Upon generation of the direct session between the audio input resource stack 710 and the input resource 780, the audio input resource stack 710 can employ the cache memory control component 750 to instantiate a cache memory, such as a ring buffer, by way of example. The some aspects, the application process interfacing component 740 can determine that the first request includes, among other things, a bitrate parameter for initializing the input resource 780. In this regard, the audio input resource stack 710 can establish the direct connection with the input resource 780 by establishing the direct session utilizing the bitrate parameter from the first request. In some instances, the cache memory control component 750 can also instantiate the cache memory with a bitrate parameter based on the first request.

After the cache memory is instantiated, the audio input resource stack 710 can employ the session controller component 760 to generate a new first session with the first application process, via the application process interfacing component 740. That is, the generated session can provide the first application process with a false indication that the first application process has received the exclusive access to the input resource 780 anticipated thereby. The audio input resource stack 710 can receive, via the direct session to the input resource 780, audio data processed by the input resource 780. When the audio data is received through the direct session, the cache memory control component 750 writes the received audio data to the instantiated cache memory. Further, the application process interfacing component 740 associates the first session from the first application process with the instantiated cache memory, so that audio data written to the instantiated cache memory is read by the first application process as if it were receiving audio data from the input resource 780.

The application process interfacing component 740 can also flag the first application process and first generated session as a "master" session, such that the first application process associated therewith can maintain operational control of the input resource 780. In this regard, any subsequent in time and concurrent application process in communication with the audio input resource stack 710 can only receive false indications that desired operational control of the input resource 780 was successful, in accordance with described embodiments.

The application process interfacing component 740 can further receive a subsequent in time request from at least a second application process to access the input resource 780. The application process interfacing component 740, having flagged a master session, can determine that no direct session or cache memory instantiation operations are to take place. Instead, the application process interfacing component 740 can employ the session controller component 760 to generate a new second session with the second application process, such that the second application process can concurrently read audio data from the instantiated cache memory. In this way, two or more application processes can concurrently read audio data, in real-time, from audio data received from an input resource 780.

In some instances, the application process interfacing component 740 can determine, from a received application process request, a bitrate parameter included in the request to initialize the input resource 780. In other words, the received request can include an audio bitrate parameter that the requesting application provides to the input resource 780 for encoding audio data received thereby, via a microphone by way of example. To resolve a conflict of two or more application processes requesting and/or requiring audio data at variable bitrates, the audio input resource stack 710, upon receiving a first application process request including a first bitrate parameter, can employ the application process interfacing component 740 to designate the first application process as the master, and utilize the included parameters of the first application process request to establish the direct session with the input resource 780. As such, any subsequently received requests from later in time application processes cannot read, via a typically-generated session, audio data directly from the instantiated cache.

Alternatively, the audio input resource stack 710 can employ the resampling component 770, which in one embodiment, can employ the cache memory control component 750 to instantiate a secondary cache memory. The resampling component 770 can further read the audio data stored in the instantiated cache memory, and continuously resample the read audio data, from the first bitrate to the second bitrate, and write the resampled audio data into the instantiated secondary cache memory. Moreover, the session controller component 760, instead of generating a second session between the second application process and the originally instantiated cache memory, can generate the second session to facilitate communication between the second application process and the instantiated secondary cache memory. In this way, the second application process can concurrently access the real-time audio data received via the input resource 780. While it is contemplated that some amount of latency is likely with the resampling of audio data, the amount can be negligible such that the two concurrently executing applications and their respective first and second application processes would not suffer any detrimental effects. Particularly when the first application process is associated with a voice-operated input controller, any latency involved with a second application process would likely be irrelevant as instructions from the voice-operated input controller would preferably take priority over any concurrently executing processes.

In another embodiment, the resampling component 770, instead of instantiating a secondary cache memory, can directly read and resample the first bitrate audio data stored in the instantiated cache memory to the second bitrate audio data requested by the second application process. In this regard, the application process interfacing component 740 can employ the session controller component 760 to generate the second session between the second application process and the resampling component 770. In this way, the resampling component 70 can read and resample the first bitrate audio data from the instantiated cache, and distribute the resampled second bitrate audio data to one or more application processes that had requested the second bitrate data, via respectively generated sessions between the application processes and the resampling component 770.

When the audio input resource stack 710 receives a request to close the input resource 780 from the second application process or any subsequent in time application process, the application process interfacing component 740 can receive the request, determine that the request is associated with a non-master application process, and send a signal to the session controller component 760 to terminate the established session between one of the resampling component 770 or the instantiated cache memory, depending on the implemented embodiment. In some aspects, the application process interfacing component 740 can generate a signal that falsely indicates a successful termination of a direct session between the requesting application process and the input resource 780 when in fact, only the process-to-instantiated cache session is terminated for the requesting application process.

Meanwhile, the first application process can continue to receive audio data from the instantiated cache, completely unaffected by the second application process or subsequent in time application processes that have concurrently accessed the audio data from the input resource 780. When the first application generates and sends a request to close the input resource 780, the application process interfacing component 740 can determine, based on the flag initially set upon receiving the first application process request, that the close request is associated with the master process. To this end, the application process interfacing component 740 can employ the session controller component 760 to close the direct session between the audio input resource stack 710 and the input resource 780, close the first session generated between the first application process and the instantiated cache, and in some aspects, generate a signal that falsely indicates a successful termination of a direct session between the first application process and the input resource 780.

Figure 8:
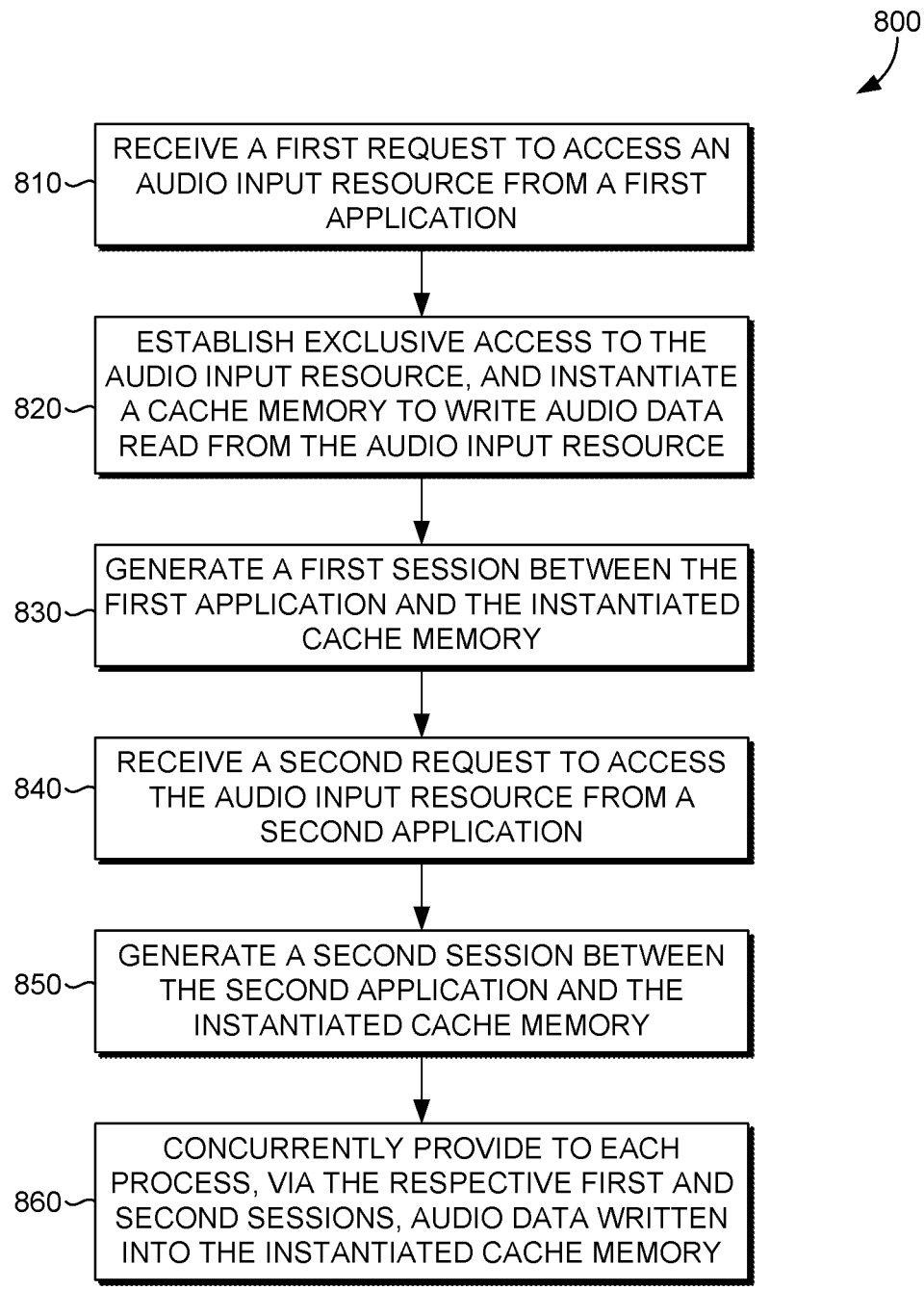
FIG. 8 is a flow diagram showing a method for providing multiple applications with concurrent access to an input resource, in accordance with some implementations of the present disclosure.

With reference now to FIG. 8, a flow diagram is provided that illustrates a method 800 for facilitating the concurrent connection of at least two application processes to a single audio input resource. The method 800 may be performed at least in part, for instance, by the head mount display 320 of FIG. 3. Each block or step of method 800 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At block 810, an audio stack employing at least one processor of a computing device can receive, from a first application or a process thereof (hereinafter the "first process"), a first request to access an audio input resource of the computing device. The first process can be configured, as conventional systems, exclusive access to the audio input resource.

At block 820, and based on receiving the first request, the audio stack can directly establish exclusive access to the audio input resource by opening a direct session between the audio stack and the audio input resource. Further, the audio stack can instantiate a cache memory, accessible to the audio stack, so that audio data processed by the audio input resource and read by the audio stack via the direct session, can write the processed audio data to the instantiated cache memory. It is contemplated that the cache memory is only a temporary cache, as audio data is typically received and written into a buffer of the audio input resource in small portions. In this regard, the audio stack can read the processed audio data from the audio input resource, and write the processed audio data into the instantiated cache to model the audio input resource buffer.

At block 830, the audio stack can generate a first session between the first process and the instantiated cache memory, so as to replicate a direct session between the first process and the audio input resource. In this regard, the first process can be provided with a false indication that it has obtained exclusive access to the audio input resource, when in fact, the audio stack has established the direct session to the audio input resource itself. As the audio stack reads audio data from the audio input resource, and writes audio data into the instantiated cache, the first process can read the audio data from the instantiated cache, as if it were receiving audio data directly from the audio input resource.

At block 840, the audio stack can receive a second request to access the audio input resource from a second application or process thereof (hereinafter the "second process"). Like the first request, the second request anticipates receiving exclusive access to the audio input resource based on its request to the audio stack.

At block 850, the audio stack can generate a second session between the second process and the instantiated cache memory. Like the first session generated for the first process, the second session is generated to provide the second process with concurrent access to the audio data stored in the instantiated cache memory. Similarly, the second process can be provided with a false indication that it has obtained exclusive access to the audio input resource, when in fact, the audio stack maintains the direct session to the audio input resource based on the first process request.

At block 860, as each of the first and second sessions are generated and established between the instantiated cache and the respective first and second processes, each process can concurrently read the audio data from the instantiated cache at the audio data is written into the instantiated cache by the audio stack. In this way, at least the first and second sessions can concurrently access the audio input resource that, traditionally, would only facilitate exclusive single process access to the audio input resource.

While reference to the audio stack is described herein as a component that performs the steps of the above method, it is contemplated that the audio stack can employ one or more processors of the computing device on which the audio stack is installed. Further, the steps of the described method can include any of the various features described in accordance with the present disclosure, such that any of the disclosed features described with reference to FIGS. 2-7 may be included in the aforementioned steps to implement the embodiments and/or alternative embodiments disclosed herein.

Accordingly, various aspects of technology for providing at least two application processes concurrent access to a single audio input resource is described. It is understood that various features, sub-combinations, and modifications of the embodiments described herein are of utility and may be employed in other embodiments without reference to other features or sub-combinations. Moreover, the order and sequences of steps shown in the example method 800 are not meant to limit the scope of the present invention in any way, and in fact, the steps may occur in a variety of different sequences within embodiments hereof. Such variations and combinations thereof are also contemplated to be within the scope of embodiments of the invention.

Figure 9:
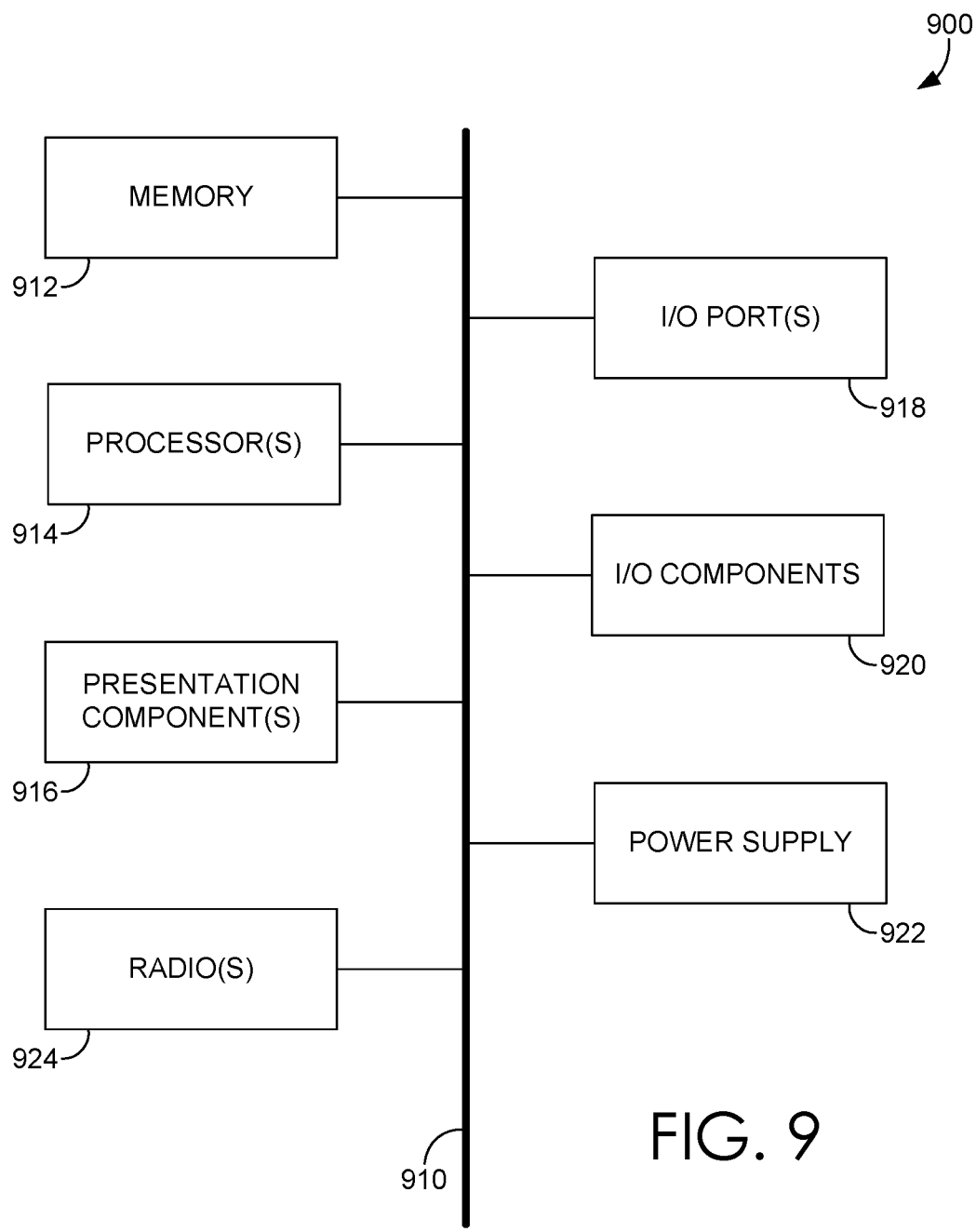
FIG. 9 is a block diagram of an exemplary computing environment suitable for use in accordance with some implementations of the present disclosure.

Having described various embodiments of the invention, an exemplary computing environment suitable for implementing embodiments of the invention is now described. With reference to FIG. 9, an exemplary computing device is provided and referred to generally as computing device 900. The computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component.

Also, processors have memory. The inventors hereof recognize that such is the nature of the art and reiterate that the diagram of FIG. 9 is merely illustrative of an exemplary computing device that can be used in connection with one or more embodiments of the present invention. Distinction is not made between such categories as "workstation," "server," "laptop," "handheld device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 914 that read data from various entities such as memory 912 or I/O components 920. Presentation component(s) 916 presents data indications to a user or other device. Exemplary presentation components include a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some embodiments of computing device 900 may include one or more radio(s) 924 (or similar wireless communication components). The radio 924 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A non-transitory computer storage medium storing computer-useable instructions that, when used by one or more computing devices, cause the one or more computing devices to perform operations comprising:
   receiving, from a first process of a first application, a first request to access an audio input hardware component that receives audio input signals from a microphone of a computing device, wherein the audio input hardware component is configured to provide access to one process at a time;
   based on the first request, instantiating a cache memory to store therein at least a portion of audio data read from the audio input hardware component;
   in lieu of providing the first process the access to the audio input hardware component, generating a first session, between the first process and the instantiated cache memory, to provide the first process with at least a first false indication that the access to the audio input hardware component has been provided to the first process;
   receiving, from a second process of a second application, a second request to access the audio input hardware component;
   in lieu of providing the second process the access to the audio input hardware component, generating a second session, between the second process and the instantiated cache memory, to provide the second process with at least a second false indication that the access to the audio input hardware component has been provided to the second process; and
   providing, concurrently to each of the first and second processes via the first and second generated sessions, respectively, at least the portion of audio data stored in the instantiated cache memory such that the first and second processes concurrently read and respectively process at least the concurrently provided portion of audio data, wherein the operations are performed by an audio stack associated with the audio input hardware component of the one or more computing devices.

2. The medium of claim 1, the operations further comprising:
   receiving, from the first process, a termination request to terminate the access to the audio input hardware component; and
   terminating the generated first session based on the received termination request, wherein a signal that the access has been terminated is provided to the first process based on the termination of the generated first session.

3. The medium of claim 1, the operations further comprising:
   receiving, from the second process, a termination request to terminate the access to the audio input hardware component; and
   terminating the generated second session based on the received termination request, wherein a signal that the access has been terminated is provided to the second process based on the termination of the generated second session.

4. The medium of claim 1,
   wherein the first request includes a first bitrate, and
   wherein the cache memory is instantiated to store at least the portion of audio data at the first bitrate based on the first bitrate included in the first request.

5. The medium of claim 4, the operations further comprising:
   based on determining that the received second request includes a second bitrate, resampling, for the second process, at least the portion of audio data stored in the cache memory from the first bitrate to the second bitrate.

6. The medium of claim 5,
   wherein at least the converted portion of audio data at the second bitrate is provided to the second process via the generated second session, and at least the portion of audio data at the first bitrate is provided to the first process via the generated first session.

7. The medium of claim 1, wherein the cache memory includes a ring buffer.

8. A computer-implemented method for providing multiple processes with simultaneous access to a single-process resource, the method comprising:
- accessing, by an audio stack associated with an audio input hardware component that receives audio input signals from a microphone of a computing device, the audio input hardware component in response to receiving, from a first process of a first application, a first request to access the audio input hardware component, wherein the audio input hardware component is configured to provide access to one process at a time, and the access is provided to the audio stack in lieu of the first process based on the received first request;
- instantiating, by the audio stack, a ring buffer to write at least a portion of audio data read from the audio input hardware component based on the access provided to the audio stack;
- generating, by the audio stack, a first session between the first process and the instantiated ring buffer, wherein at least a first false indication that the access to the audio input hardware component has been provided to the first process is communicated to the first process based on the first request;
- generating, by the audio stack, a second session between a second process of a second application and the instantiated ring buffer responsive to receiving, from the second process, a second request to access the audio input hardware component, wherein at least a second false indication that the access to the audio input hardware component has been provided to the second process is communicated to the second process based on the second request; and
- concurrently providing, by the audio stack and to each of the first and second processes via the first and second generated sessions, respectively, at least the portion of audio data stored in the instantiated ring buffer such that the first and second processes concurrently read and respectively process at least the portion of audio data.

9. The method of claim 8, wherein the ring buffer is instantiated to store at least the portion of received audio data at a first bitrate, the first bitrate being included in the first request, and wherein the method further comprises:
- based on determining, by the audio stack, that the received second request includes a second bitrate, resampling, by the audio stack, at least the portion of audio data stored in the ring buffer from the first bitrate to the second bitrate.

10. The method of claim 8, further comprising:
- receiving, by the audio stack and from the first process, a termination request to terminate the access to the audio input hardware component; and
- terminating, by the audio stack, the generated first session based on the received termination request.

11. The method of claim 8, further comprising:
- receiving, by the audio stack and from the second process, a termination request to terminate the access to the audio input hardware component; and
- terminating, by the audio stack, the generated second session based on the received termination request.

12. The method of claim 8, wherein the first application is configured to interpret at least the portion of audio data, and the second application is configured to store or transmit at least the portion of audio data.

13. The method of claim 8, wherein the audio stack is one of a modified audio stack and a customized audio stack.

14. A computerized system comprising:
- a microphone coupled to an audio input receiving module;
- one or more processors; and
- one or more computer storage media storing computer-usable instructions that, when used by the one or more processors, cause the one or more processors to:
- initialize an audio stack associated with the audio input receiving module, wherein the audio input receiving module is configured to provide access to one process at a time;
- receive, from a first process of a first application, a first request to access the audio input receiving module;
- establish, by the audio stack, access to the audio input receiving module based on the received first request, wherein the access to the audio input receiving module is established by the audio stack in lieu of the first process;
- instantiate, by the audio stack, a ring buffer to store therein at least a portion of audio data read from the audio input receiving module based on the established access, wherein the audio input receiving module generates audio data based on audio signals received via the microphone;
- generate, by the audio stack, a first session between the first process and the instantiated ring buffer based on the received first request, wherein at least a first false indication that the first process was provided access to the audio input receiving module is provided to the first process;
- receive, from a second process of a second application, a second request to access the audio input receiving module;
- generate, by the audio stack, a second session between the second process and the instantiated ring buffer based on the received second request, wherein at least a second false indication that the second process was provided access to the audio input receiving module is provided to the second process; and
- concurrently provide, by the audio stack, to each of the first and second processes via the first and second generated sessions, respectively, at least the portion of audio data stored in the instantiated ring buffer such that the first and second processes concurrently read and respectively process at least the portion of audio data.

15. The computerized system of claim 14, further comprising a head-mounted display, wherein the microphone is coupled to the head-mounted display.

16. The computer system of claim 15, wherein the first application is configured to interpret at least the portion of audio data, and the second application is configured to store or transmit at least the portion of audio data.

17. The computer system of claim 14, wherein the first application is employed to navigate the second application.

18. The computer system of claim 14, wherein the ring buffer is instantiated to store therein at least the portion of received audio data at a first bitrate, the first bitrate being included in the first request, and
- wherein the computer-usable instructions, when used by the one or more processors, further cause the one or more processors to:
- resample at least the portion of audio data stored in the ring buffer from the first bitrate to a second bitrate based on determining that the received second request includes the second bitrate.

* * * * *